United States Patent
Guthke et al.

(10) Patent No.: US 8,991,773 B2
(45) Date of Patent: Mar. 31, 2015

(54) DEVICE FOR MOUNTING SYSTEMS ON AIRCRAFT OR SPACECRAFT

(75) Inventors: Hans Peter Guthke, Buxtehude (DE); Barbara Lunitz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 110 days.

(21) Appl. No.: 13/193,269

(22) Filed: Jul. 28, 2011

(65) Prior Publication Data

US 2012/0037756 A1 Feb. 16, 2012

Related U.S. Application Data

(60) Provisional application No. 61/372,306, filed on Aug. 10, 2010.

(30) Foreign Application Priority Data

Aug. 10, 2010 (DE) .......................... 10 2010 039 134

(51) Int. Cl.
*E21F 17/02* (2006.01)
*F16L 3/00* (2006.01)
(Continued)

(52) U.S. Cl.
CPC *H02G 3/32* (2013.01); *B64C 1/406* (2013.01); *H02G 3/24* (2013.01)
USPC .................... 248/58; 248/56; 248/65; 248/72

(58) Field of Classification Search
CPC ................ F16L 3/11; F16L 3/24; F16L 3/14; F16L 3/18; F16L 3/127; F16M 13/00; F16B 37/045; F16B 2/065; H02G 3/263

USPC .................... 248/230, 74.3, 61, 231.5, 63, 58
See application file for complete search history.

(56) References Cited

U.S. PATENT DOCUMENTS 919,558 A 4/1909 Doran
1,568,122 A * 1/1926 Zifferer ...................... 248/228.2
(Continued)

FOREIGN PATENT DOCUMENTS

AT 403 839 B 8/2008
DE 902 482 B 1/1954
(Continued)

OTHER PUBLICATIONS

German Office Action for German Application No. 10 2010 039 136.0-24 dated Oct. 15, 2010.
(Continued)

*Primary Examiner* — Amy J Sterling
(74) *Attorney, Agent, or Firm* — Jenkins, Wilson, Taylor & Hunt, P.A.

(57) ABSTRACT

The present invention provides a device for mounting systems, for example an electrical or fluid-conveying line, on a structure, in particular of an aircraft or spacecraft, the device comprising a basic holder which is fastenable to the structure and a system holder for mounting the systems, the system holder being fastenable to a first interface of the basic holder, which system holder is fastenable to a first interface of the basic holder; the basic holder comprising a first part, which comprises the first interface, and a second part, one end of which is attachable to the first part so as to be pivotal about a pivot axis and the other end of which is fastenable to the structure.

12 Claims, 7 Drawing Sheets

(51) Int. Cl.
*B64C 1/40* (2006.01)
*H02G 3/30* (2006.01)
*H02G 3/32* (2006.01)

(56) References Cited

U.S. PATENT DOCUMENTS

| | | |
|---|---|---|
| 2,877,974 A | 3/1959 | Estes |
| 3,026,368 A | 3/1962 | Lindsey |
| 3,053,494 A | 9/1962 | Stoll |
| 3,437,743 A | 4/1969 | Lindsey |
| 3,836,102 A | 9/1974 | Hall |
| 4,073,563 A | 2/1978 | Bailey et al. |
| 4,079,604 A | 3/1978 | Anderegg |
| 4,171,861 A | 10/1979 | Hohorst |
| 4,526,333 A | 7/1985 | Nakama et al. |
| 4,541,155 A * | 9/1985 | Gagnon ............... 24/486 |
| 4,580,754 A | 4/1986 | Hughes |
| 4,646,433 A * | 3/1987 | Le Houerou et al. ....... 29/755 |
| 5,112,015 A | 5/1992 | Williams |
| 5,305,978 A * | 4/1994 | Current ............... 248/230.4 |
| 5,378,171 A | 1/1995 | Czerlanis |
| RE35,677 E | 12/1997 | O'Neill |
| 5,786,987 A | 7/1998 | Barbier et al. |
| 5,791,845 A * | 8/1998 | Fulop ............... 411/42 |
| 5,836,786 A | 11/1998 | Pepe |
| 6,161,803 A | 12/2000 | Daoud |
| 6,516,498 B2 | 2/2003 | LaCoy et al. |
| 6,547,587 B2 | 4/2003 | Hurst et al. |
| 6,568,542 B1 | 5/2003 | Chen |
| 6,666,340 B2 | 12/2003 | Basinger et al. |
| 6,994,300 B2 | 2/2006 | Labeirie et al. |
| 7,238,105 B2 | 7/2007 | Reinders |
| 7,534,958 B2 | 5/2009 | McNutt et al. |
| 7,772,325 B2 | 8/2010 | Ashiura et al. |
| 8,040,693 B2 | 10/2011 | Blomquist |
| 8,141,826 B1 | 3/2012 | Gallardo et al. |
| 8,534,614 B2 | 9/2013 | Guthke et al. |
| 8,651,435 B2 | 2/2014 | Guthke et al. |
| 2008/0296443 A1 * | 12/2008 | Lunitz et al. ............. 248/65 |
| 2009/0065658 A1 | 3/2009 | Chen et al. |
| 2011/0006169 A1 | 1/2011 | Abbott |
| 2012/0037418 A1 | 2/2012 | Zyrull et al. |
| 2012/0037763 A1 | 2/2012 | Guthke et al. |
| 2012/0037765 A1 | 2/2012 | Guthke et al. |

FOREIGN PATENT DOCUMENTS

| | | |
|---|---|---|
| DE | 86 20 533 U1 | 11/1986 |
| DE | 297 18 147 U1 | 2/1998 |
| DE | 20 2005 011 492 U1 | 12/2005 |
| DE | 10 2006 015 700 A1 | 11/2006 |
| DE | 10 2007 060 039 | 6/2008 |
| DE | 10 2007 060 030 A1 | 12/2008 |
| DE | 20 2008 011 723 | 12/2008 |
| EP | 0627587 A1 | 12/1994 |

OTHER PUBLICATIONS

German Office Action for German Application No. 10 2010 039 133.6-24 dated Mar. 22, 2011.
German Office Action for German Application No. 10 2010 039 135.2 dated Apr. 1, 2011.
German Office Action for German Application No. 10 2010 039 134.4-24 dated Apr. 1, 2011.
Non-Final Office Action for U.S. Appl. No. 13/205,963 dated Oct. 19, 2012.
Non-Final Office Action for U.S. Appl. No. 13/193,253 dated Feb. 15, 2013.
Final Office Action for U.S. Appl. No. 13/205,963 dated Feb. 21, 2013.
Non-Final Office Action for U.S. Appl. No. 13/205,174 dated Apr. 18, 2013.
Notice of Allowance for U.S. Appl. No. 13/205,963 dated May 15, 2013.
Final Office Action for U.S. Appl. No. 13/193,253 dated Jun. 17, 2013.
Final Office Action for U.S. Appl. No. 13/205,174 dated Aug. 6, 2013.
Notice of Allowance for U.S. Appl. No. 13/193,253 dated Oct. 8, 2013.
Advisory Action for U.S. Appl. No. 13/205,174 dated Oct. 15, 2013.
Non-Final Office Action for U.S. Appl. No. 13/205,174 dated Nov. 20, 2013.
Final Office Action for U.S. Appl. No. 13/205,174 dated Mar. 20, 2014.
Interview Summary for U.S. Appl. No. 13/205,174 dated May 14, 2014.
Advisory Action for U.S. Appl. No. 13/205,174 dated Jul. 29, 2014.
Non-Final Office Action for U.S. Appl. No. 13/205,174 dated Sep. 15, 2014.

* cited by examiner

DEVICE FOR MOUNTING SYSTEMS ON AIRCRAFT OR SPACECRAFT

CROSS REFERENCE TO RELATED APPLICATIONS

This application claims the benefit of and priority to U.S. Provisional Application No. 61/372,306 filed Aug. 10, 2010 and German Patent Application No. 10 2010 039 134.4-24 filed Aug. 10, 2010, the entire disclosures of which are herein incorporated by reference.

FIELD OF THE INVENTION

The present invention relates to a device for mounting systems and to an aircraft or spacecraft.

BACKGROUND OF THE INVENTION

Although they can be applied to any systems and any aircraft or spacecraft, the present invention and the problem on which it is based will be described in detail in relation to an electrical line in a passenger aircraft.

In a modern passenger aircraft, a large number of electrical components must be interconnected by means of electrical lines. If a distance between two electrical components to be connected exceeds a particular value, it is necessary, in particular for reasons of safety and order, to mount the electrical line provided for connection of the electrical components along its route between the electrical components. In this case, the mounting is generally carried out on a structure, for example on a former, of the passenger aircraft by means of a device.

DE 10 2007 060 030 A1, for example, describes a device of this type which also exhibits the features of the preamble of claim 1.

The devices for mounting systems described in DE 10 2007 060 030 A1 are well suited for fastening to structures which comprise a belt. The belt can for example be the base of a T-profile. However, the devices described in DE 10 2007 060 030 A1 cannot be fastened to a structure in the form of a C-profile or the like, or can only be fastened thereto with great difficulty.

An object of the present invention is therefore to provide a device for mounting systems, which device is fastenable in a simple manner, in particular to a C-profile. A further object of the present invention is to provide an aircraft or spacecraft comprising a device of this type.

SUMMARY OF THE INVENTION

Accordingly, a device for mounting systems, for example an electrical or fluid-conveying line, on a structure, in particular of an aircraft or spacecraft, is provided which comprises: a basic holder which is fastenable to the structure; and a system holder for mounting the systems, which system holder is fastenable to a first interface of the basic holder; the basic holder comprising a first part, which comprises the first interface, and a second part, one end of which is attachable to the first part so as to be pivotal about a pivot axis and the other end of which is fastenable to the structure.

Furthermore, an aircraft or spacecraft is provided which comprises: a structure; a system; and the device according to the invention, which is fastened to the structure and holds the system relative to the structure.

One idea underlying the present invention is to provide the basic holder with the second, pivotal part. The second part can in particular be pivoted on a web of a structure formed as a C-profile, in order to connect the first part comprising the first interface to the C-profile.

Advantageous developments of the present invention emerge from the dependent claims.

According to a development of the device according to the invention, the first part comprises, at one end, at least a first element and the second part comprises, at one end, at least a second element, which elements engage one another from behind to form the pivot axis and to hold the first and second parts together. The first and second elements thus have a dual function. First, they together form the pivot axis. The first and second elements also engage one another from behind in such a way that the second part holds the first part on the structure with positive locking.

According to a further development of the device according to the invention, the first and second elements comprise at least one projection and one recess, the projection engaging in the recess and/or engaging means fitted on the projection engaging, from behind, corresponding receiving means fitted in the recesses. The projections engaging in the recess thus form a toothing, resulting in a comparatively stable connection between the first and second parts.

According to a further development of the device according to the invention, the first part comprises, at its other end, a rear engagement portion for engaging the structure from behind. The rear engagement portion is preferably formed as a hook for engaging behind a flange of a structure formed as a C-profile.

According to a further development of the device according to the invention, the other end of the second part is connectable to a hole in the structure by means of a pin. The hole is preferably formed in the web of the structure formed as a C-profile.

According to a further development of the device according to the invention, the basic holder comprises a third part, one end of which is attached to the rear engagement portion of the first part so as to be pivotal about a pivot axis and the other end of which is fastenable to the structure. As a result, an additional part comprising a second interface for fastening a further system holder can be provided in a simple manner.

According to a further development of the device according to the invention, the third part is formed as an angle bracket. As a result, the third part can be arranged in a corner region of a structure formed as a C-profile, in such a way that the arms of the angle bracket rest against the web or the flange of the C-profile.

According to a further development of the device according to the invention, the second and/or third part comprises a second and/or third interface, to which the system holder or a further system holder is fastenable. As a result, a plurality of systems can be held on a device, in particular in such a way that the plurality of systems are held so as to extend in different spatial directions.

According to a further development of the device according to the invention, the pin comprises a first cylinder which has a substantially semi-circular cross-section and matches a second cylinder having a corresponding semi-circular cross-section. This results in a simple fastening possibility.

According to a further development of the aircraft or spacecraft according to the invention, the structure is formed as a C-profile, the first part resting in a planar manner against a flange of the C-profile and the second part resting in a planar manner against a web of the C-profile. As a result, the basic holder is fastenable to the structure in a loadable manner.

According to a further development of the aircraft or spacecraft according to the invention, the pin engages in a hole in the web of the C-profile. The second part thereby engages the C-profile from behind in relation to the first part and can therefore fasten the first part to the C-profile in a simple manner.

According to a further development of the aircraft or spacecraft according to the invention, the rear engagement portion of the first part engages the flange of the C-profile from behind. As already described above, the first part is preferably formed with a hook which engages the free end of the flange of the C-profile from behind with positive locking.

According to a further development of the aircraft or spacecraft according to the invention, the third part, which is formed as an angle bracket, is engaged at its other end with the pin. As a result, the third part is fastenable to the first and second parts in a simple manner.

BRIEF DESCRIPTION OF THE DRAWINGS

In the following, the invention will be described in further detail by way of embodiments with reference to the accompanying figures of the drawings, in which.

In the figures, like reference numerals denote like or functionally equivalent components unless indicated otherwise.

DETAILED DESCRIPTION OF THE INVENTION

Figure 1A:
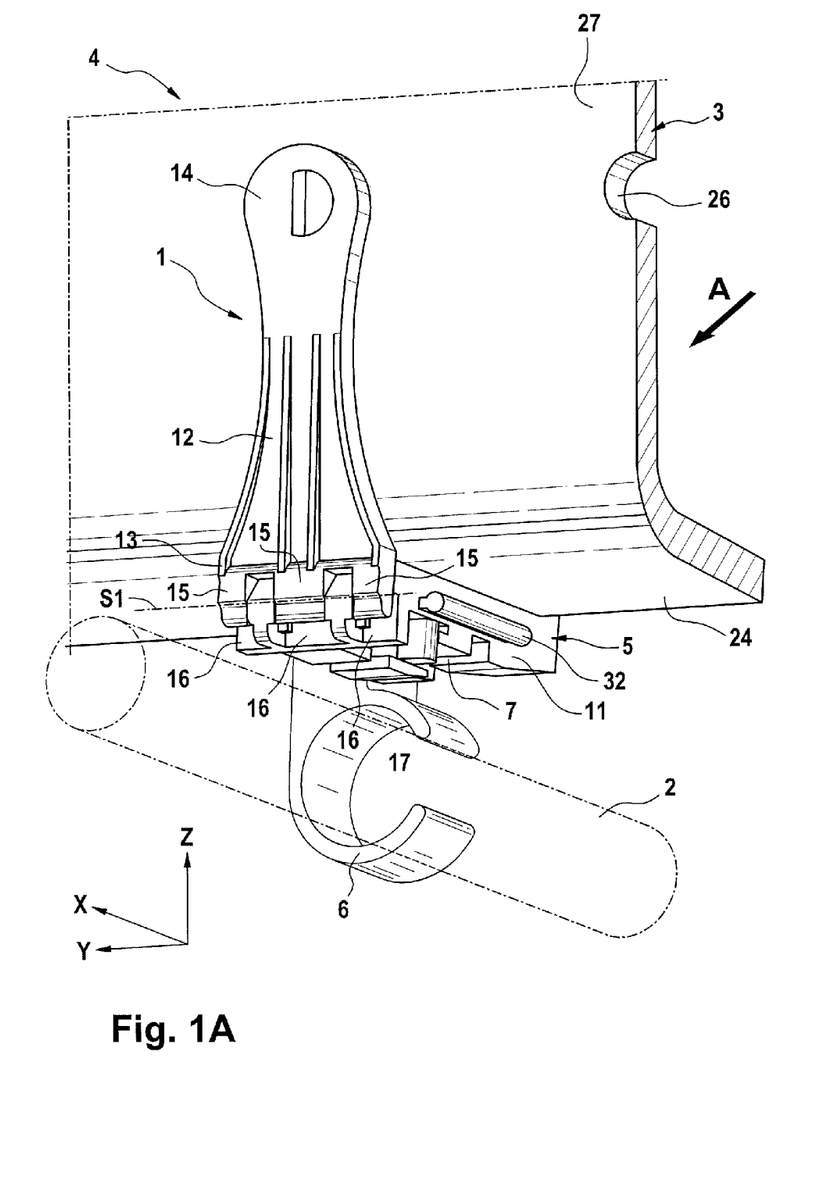
FIG. 1A is a perspective view of a device according to an embodiment of the present invention.
Figure 1B:
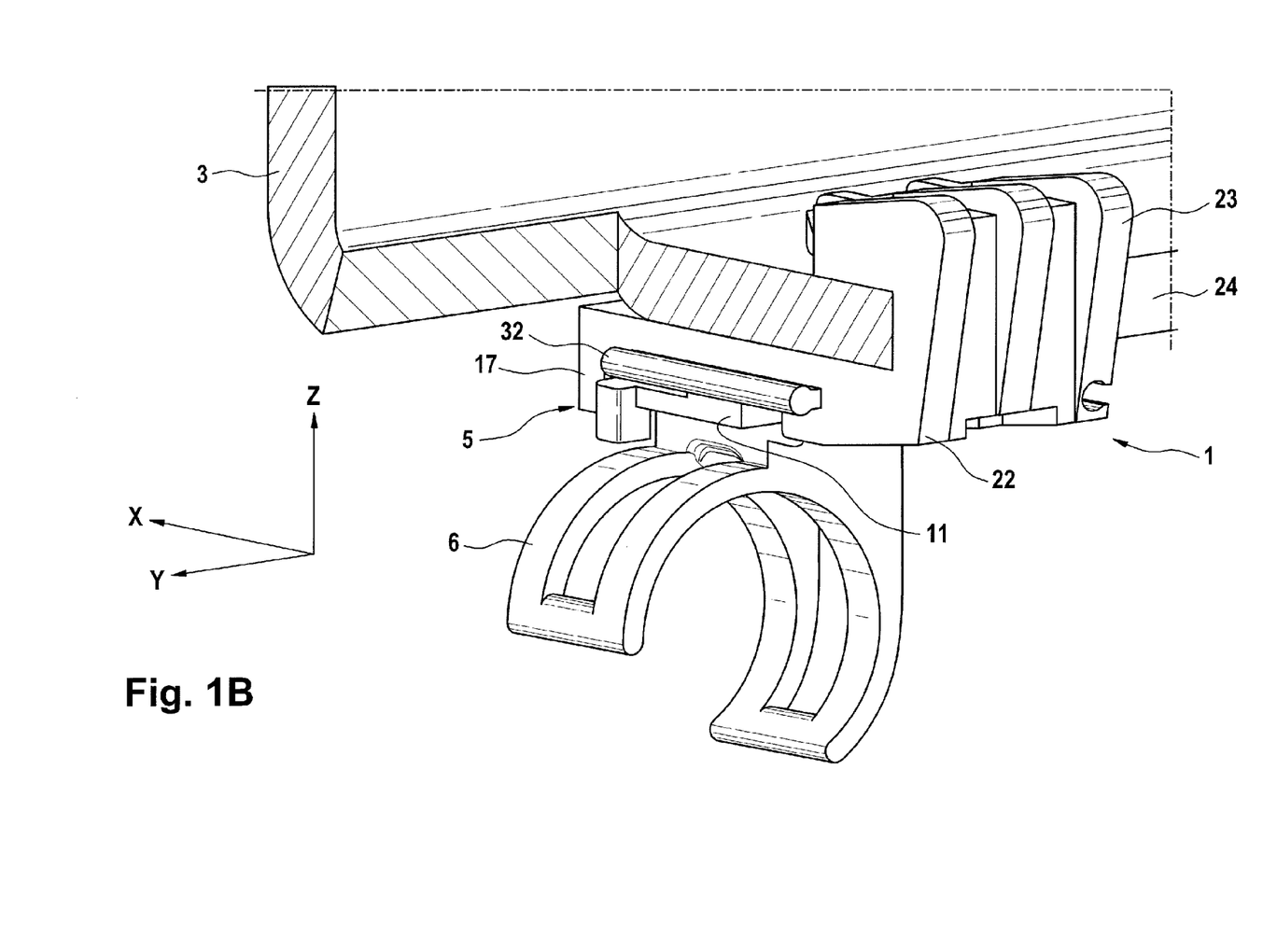
FIG. 1B shows a view A from FIG. 1A.

FIG. 1A is a perspective view of a device 1 according to an embodiment of the present invention and FIG. 1B shows a view A from FIG. 1A.

The device 1 is formed for mounting systems, for example an electrical or fluid-conveying line 2 which is shown as a dashed line in FIG. 1A. The device 1 holds the line 2 opposite a structure formed for example as a C-profile 3. The C-profile can for example be a component of an aircraft which, as a whole, is denoted by reference numeral 4, but which is not shown further in the figures.

The device 1 comprises a basic holder 5, which is fastened to the C-profile 3 in a manner which will be described in further detail below.

The device 1 further comprises a system holder 6 which is shown by way of a dashed line in FIG. 1A. The system holder 6 holds the line 2, for example by engaging around the line 2 in portions. The system holder 6 is fastened, in particular releasably, to a first interface 7 of the basic holder 5. For this purpose, the system holder 6 has a corresponding shape, which can be brought into engagement with, in particular locked to, a matching shape of the first interface 7. For example, DE 10 2007 060 039 A1 describes various connection principles of this type between a system holder and a basic holder.

The basic holder 5 is made up of a first part 11 and a second part 12. The first part 11 comprises the first interface 7. The second part 12 is attached at one end 13 to the first part 11 so as to be pivotal about a pivot axis S1. At its other end 14, the second part 12 can be fastened, in particular releasably, to the C-profile 3.

The end 13 of the second part 12 comprises, for example, three projections 15. The projections 15 engage in recesses 16 in one end 17 of the first part 11. As a result, a type of toothing is produced between the end 13 of the second part 12 and the end 17 of the first part 11.

Figure 2:
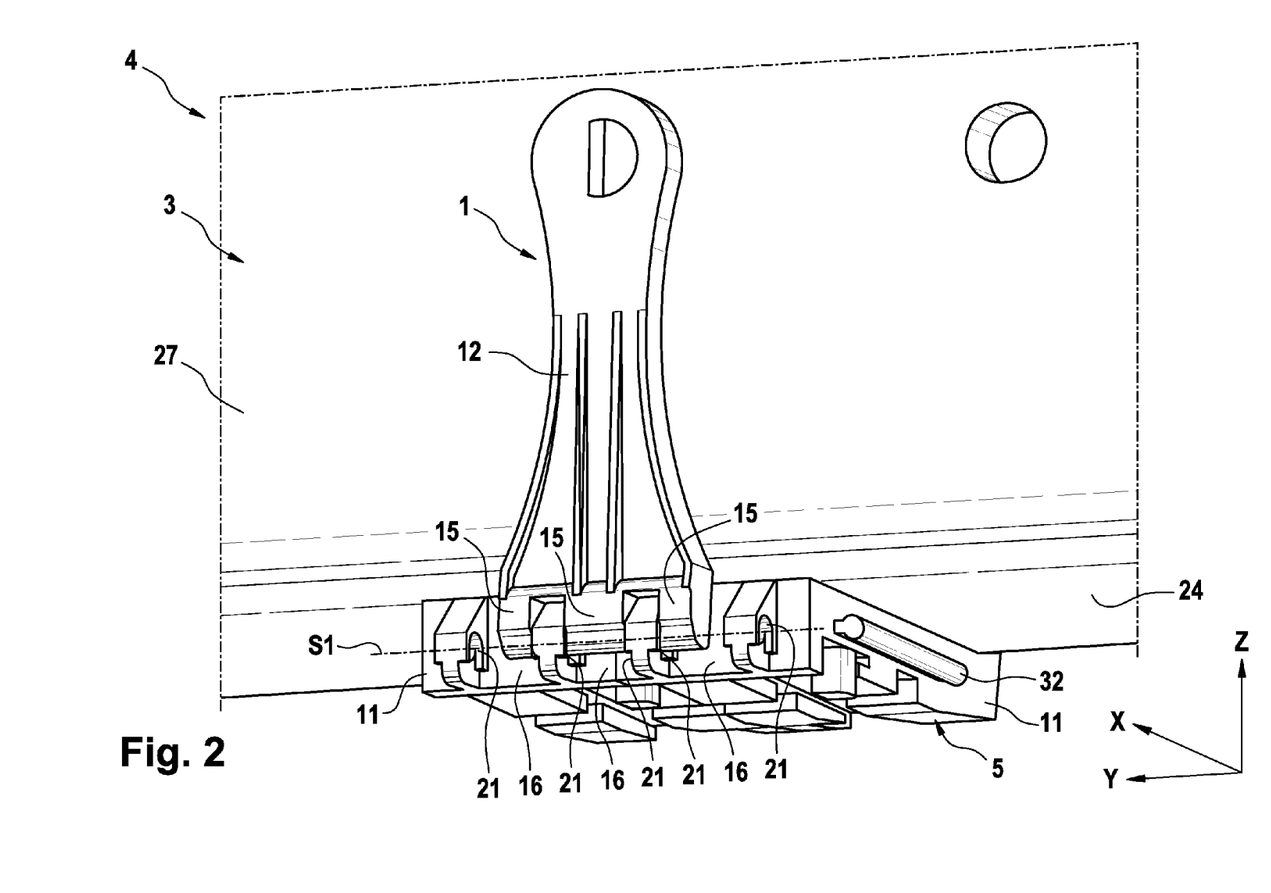
FIG. 2 is a perspective view of a device according to a further embodiment of the present invention.

As can be seen from FIG. 2 (in this respect the embodiments according to FIG. 1A and FIG. 2 correspond), engaging means (not visible), which engage in corresponding receiving means 21, are integrally formed on the projections 15. The receiving means 21 are formed, for example, as semi-circular cavities. As a result, there is positive locking between the first and second parts 11, 12 in the Z-direction, which for example coincides with the vertical direction of the aircraft 4. In addition, the engaging means and receiving means 21 together form the pivot axis S1.

In the rear-side view A of FIG. 1A, which is shown in FIG. 1B, the system holder 6 is shown by way of a continuous line. Moreover, the second part 12 shown in FIG. 1 is not shown in FIG. 1B for reasons of clarity.

The first part 11 of the basic holder 5 comprises, at its end 22 opposite the end 17, a hook 23 which engages a flange 24 of the C-profile 3 from behind. As a result, the first part 11 of the basic holder 5 is engaged with the flange 24 in the Z-direction with positive locking.

Returning now to FIG. 1A, it can be seen therein that the end 14 of the second part 12 is engaged by means of a pin 25 (see FIG. 4B) with one of for example a plurality of holes 26 in a web 27 of the C-profile 3. As a result, a positive connection is provided in the Z-direction between the second part 12 of the basic holder 5 and the web 27 of the C-profile 3.

The first part 11 which carries the system holder 6 is thus held, at its two ends 17 and 22, on the C-profile 3 in the Z-direction.

In the Y-direction, which is substantially perpendicular to the Z-direction, the projections 15 and the recesses 16 of the first and second parts 11, 12 are mutually engaged with positive locking, in such a way that the first part 11 is also held rigidly in the Y-direction. The Y-direction coincides for example with the transverse direction of the aircraft 4.

Figure 4A:
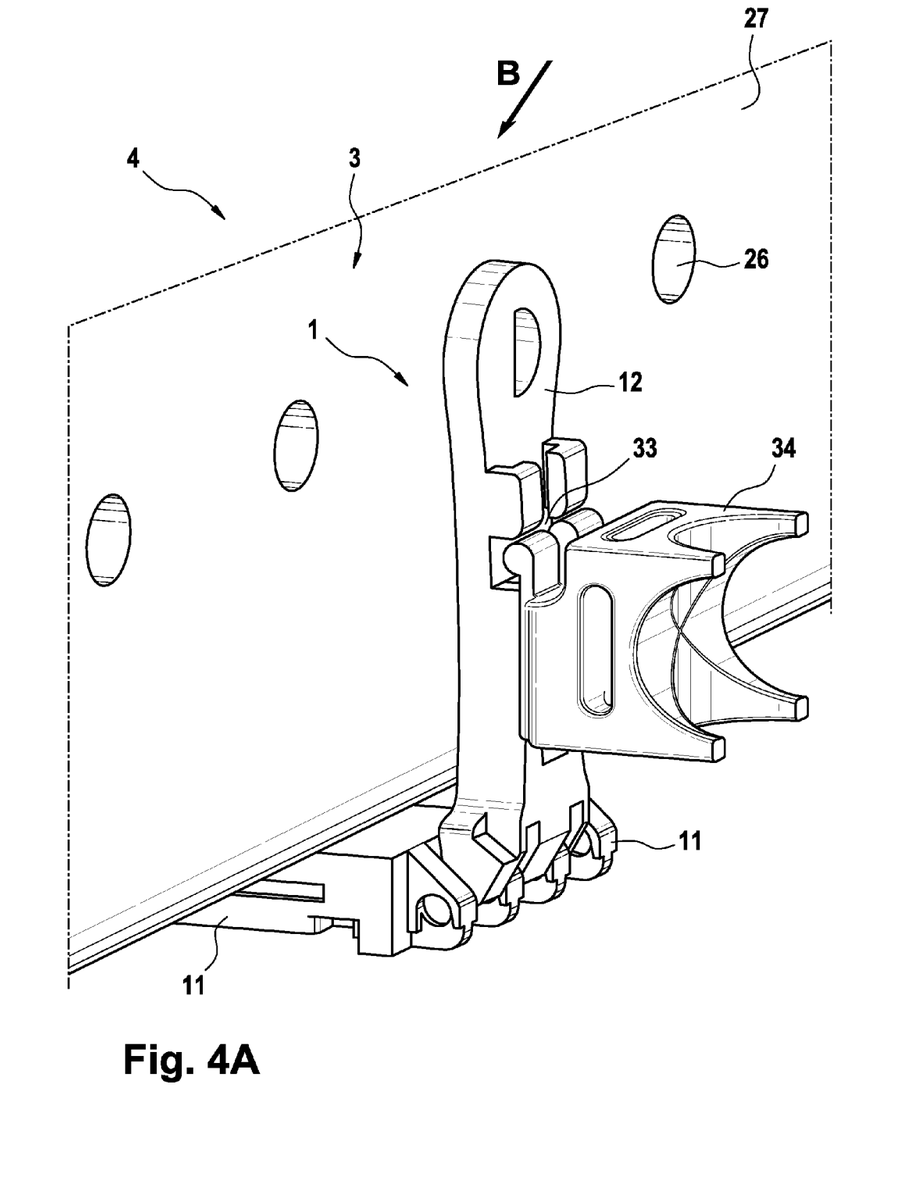
FIG. 4A is a perspective view of a device according to a further embodiment of the present invention.
Figure 4B:
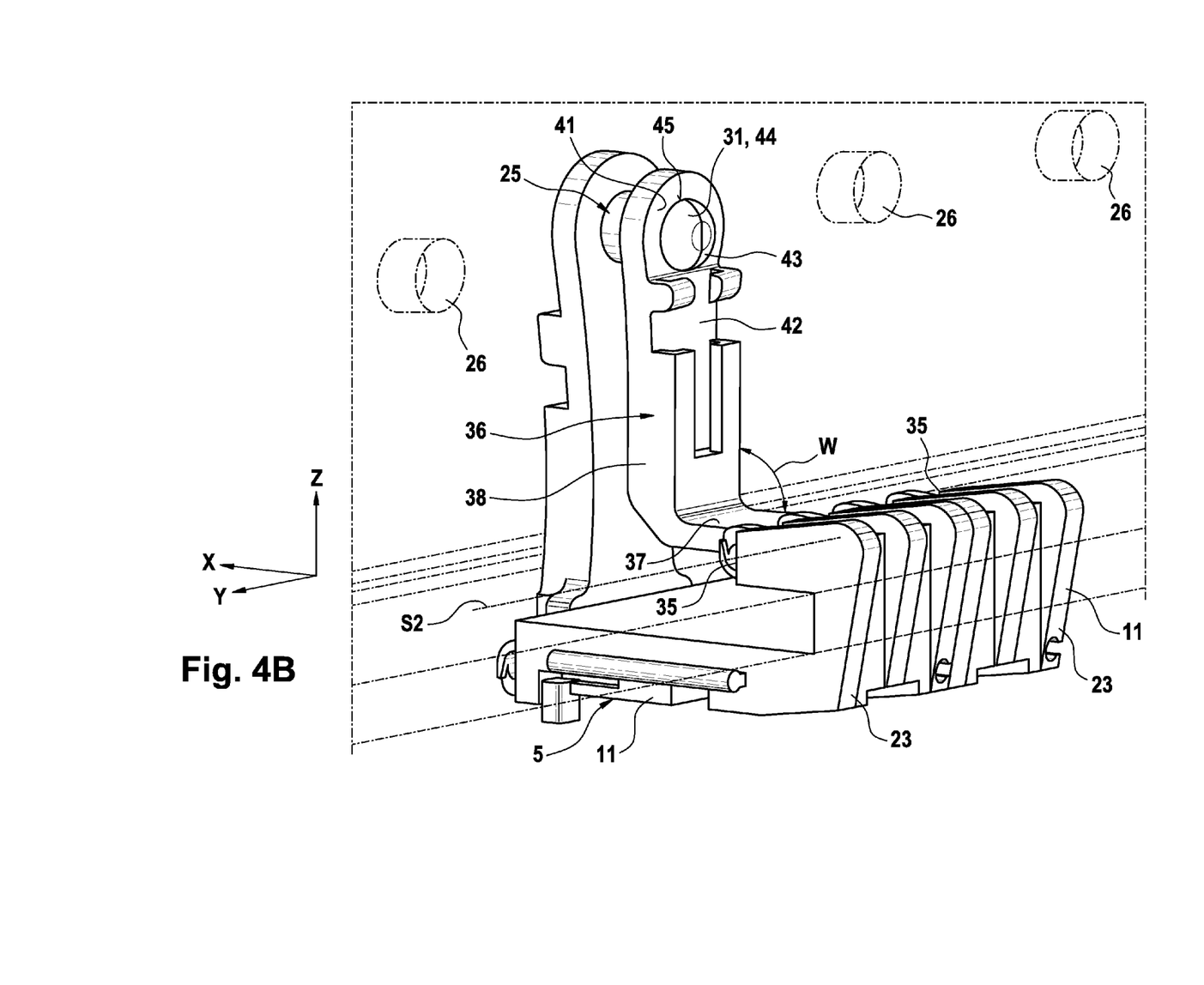
FIG. 4B shows a view B from FIG. 1.

With further reference to FIG. 1A, and FIG. 4B, the pin 25 is formed with a first cylinder 31 which has a substantially semi-circular cross-section. The first cylinder 31 is slid into the hole 26 from the side of the web 27 which faces the second part 12 in FIG. 1A. A second cylinder 43 (see FIG. 4B—in this respect the embodiments according to FIG. 1A and FIG. 4B correspond) with a corresponding semi-circular cross-section is slid into the hole 26 from the other side of the web 27, the first and second cylinders then complementing one another to form one cylinder with an approximately circular cross-section. As a result, the pin 25 is held securely in the hole 26.

The first part 11 thus rests in a planar manner against the flange 24 of the C-profile 3 and the second part 12 rests in a planar manner against the web 27 of the C-profile 3.

The basic holder 5, in particular the first part 11 thereof, can comprise on each side in the Y-direction a means 32 for interlinking the basic holder 5 with further basic holders, which in particular are formed in an identical manner, as described in DE 10 2007 060 030 A1, which corresponds to U.S. Pat. No. 8,534,624.

FIG. 2 is a perspective view of a device 1 according to a further embodiment of the present invention.

The device 1 according to FIG. 2 differs from that according to FIGS. 1A and 1B merely in that the second part 12 simultaneously holds two first parts 11 of the basic holder 5, which parts are interlinked via the means 32. For this purpose, the second part 12 is interlocked with the two first parts 11 in the manner described above in connection with FIGS. 1A and 1B.

Figure 3:
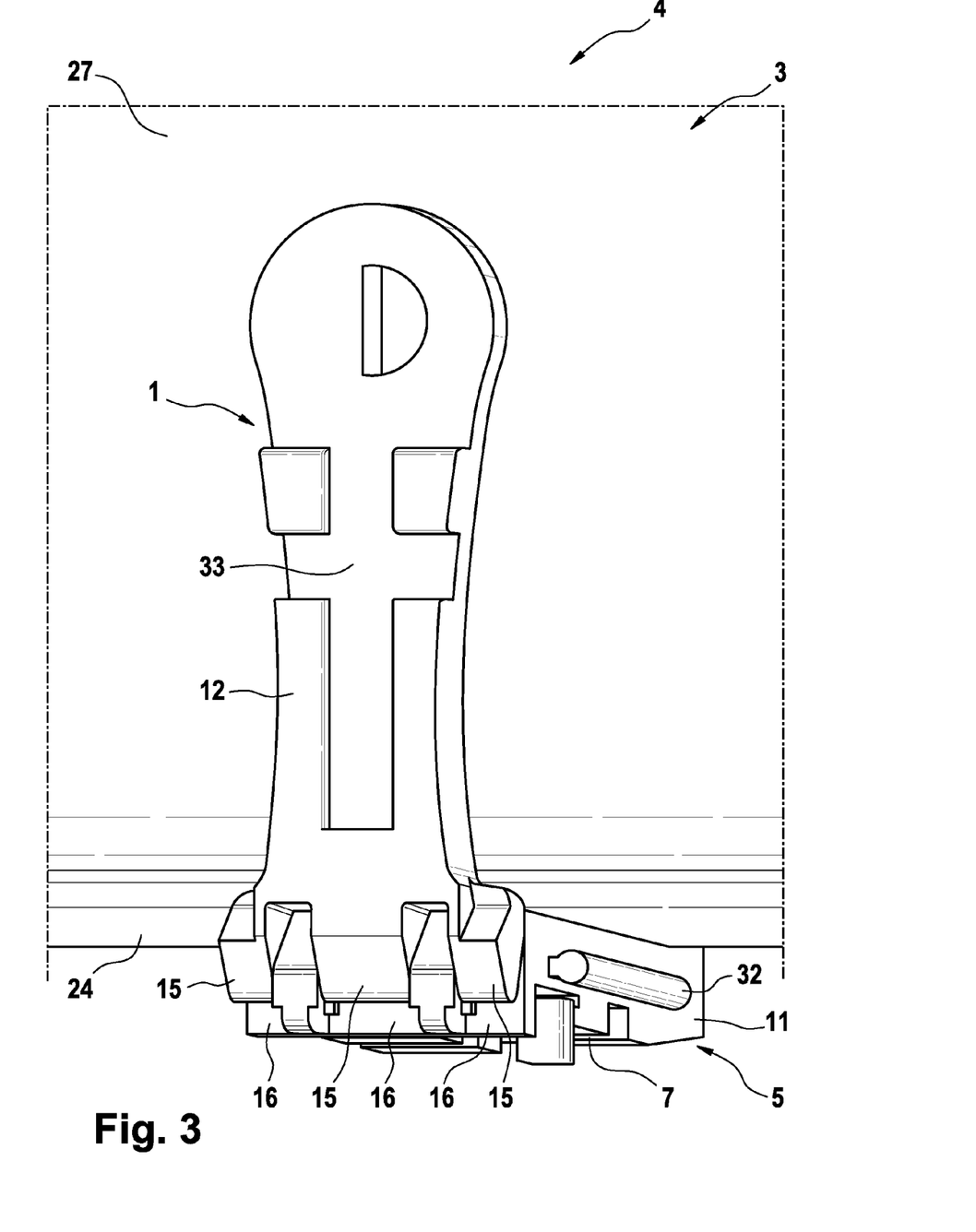
FIG. 3 is a perspective view of a device according to a further embodiment of the present invention.

FIG. 3 is a perspective view of a device 1 according to a further embodiment of the present invention.

The device 1 according to FIG. 3 differs from that according to FIGS. 1A and 1B in that the second part 12 comprises a second interface 33 for attaching the system holder 6 or an additional system holder (not shown). The second interface 33 can be formed in an identical manner to the first interface 7, in such a way that a system holder 6 which is fastened to the interface 7 can be released from the interface 7 without difficulty and fastened to the second interface 33.

Figure 4C:
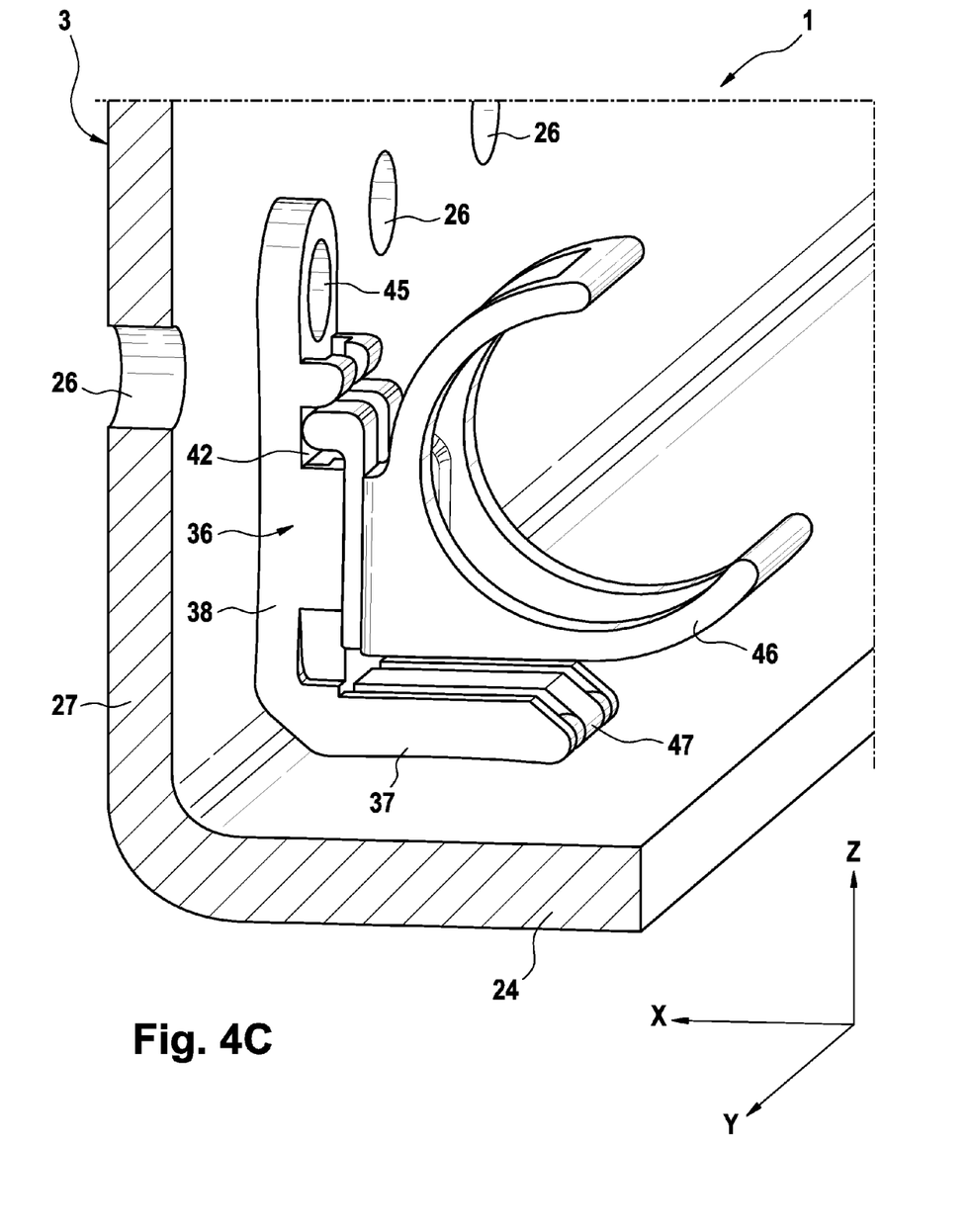
FIG. 4C shows the view from FIG. 4B, some of the components shown in FIG. 4B not being shown and an addition system holder being provided.

FIG. 4A is a perspective view of a device 1 according to a further embodiment of the present invention, FIG. 4B shows a rear-side view B from FIG. 4A, and FIG. 4C shows the view from FIG. 40, various components not being shown and a third system holder 46 being provided.

The device 1 according to FIG. 4A-4C differs from that according to FIGS. 1A and 1B in that the second part 12 is connected to two first parts 11, as already shown in FIG. 2. The second part 12 further comprises the second interface 33, to which a second system holder 34 is releasably attached, as already explained in connection with FIG. 3.

Furthermore, in contrast to the embodiments according to FIGS. 1A and 1B, a third part 36 is fastened to the free ends 35 (see FIG. 4B) of the hooks 23 of the two first parts 11 of the basic holder 5 so as to be pivotal about a second pivot axis 82. The pivotal fastening can be provided in a releasable manner, so that the third part 36 can be released from the hooks 23.

The third part 36 is formed as an angle bracket comprising two arms 37 and 38 which together form an angle W of approximately 90°. The first arm 37 of the third part 36 is articulated to the free ends 35 of the hooks 23, as described above. The second arm 38 comprises a third interface 42 for attaching a third system holder 46 (see FIG. 4C) or the first system holder 6 shown in FIG. 1A or the second system holder 34 shown in FIG. 4A. At its free end 41, the second arm 38 is engaged with the hole 26 along the Z-direction by means of the first cylinder 31 and the second cylinder 43 mentioned in connection with FIG. 1A and shown in FIG. 4B. The first cylinder 31 can also be formed with a thickening 44 at one end, in such a way that an automatic release of the second arm 38 from the cylinder 31 can be avoided. The cylinders 31 and 43 preferably extend through a hole 45 in the second arm 38.

For better clarity, FIG. 4C shows once again the view from FIG. 4B, with only the third part 36, with a third system holder 46 suspended in the third interface 42, being shown.

As can clearly be seen in FIG. 4C, the first arm 37 of the third part 36 lies in a substantially planar manner against the flange 24 of the C-profile 3 and the second arm 38 of the third part 36 lies in a substantially planar manner against the web 26 of the C-profile 3.

The end 47 of the first arm 37 of the third part 36 can also be seen in FIG. 4C, which end forms, together with the free ends 35 of the hooks 23 (see FIG. 4B), the second pivot axis S2 and is engaged with the free ends 35 with positive locking, at least in the X-direction. This engagement is preferably releasable. The X-direction is substantially perpendicular to the Y- and Z-directions and coincides for example with the longitudinal direction of the aircraft 4.

Obviously, in the embodiment according to FIG. 4A-4C, instead of the two first parts 11 it would also be possible to provide only one first part 11, as explained in connection with FIGS. 1A and 1B.

Although the invention has been described herein with reference to preferred embodiments, it is in no way limited thereto, but can be modified in a variety of ways. In particular, the developments and embodiments described herein for the device according to the invention can be applied accordingly to the aircraft or spacecraft according to the invention, and vice versa. It should also be noted that where "a/an" is used herein this does not exclude a plurality.

The invention claimed is:

1. A device for mounting systems, on a C-profile structure, in particular of an aircraft or spacecraft, comprising:
   a basic holder;
   at least one system holder for mounting the systems, said at least one system holder being fastenable to at least one interface of the basic holder;
   wherein the basic holder further comprises at least one first part, and a second part,
   wherein an end of said second part is attached to the at least first part so as to be pivotal about a pivot axis and another end of said second part is releasably connectable to a hole penetrating through in a web portion of the structure by a pin having a semi-circular cross section; and
   wherein the second part is configured to rest in a planar manner against the web portion of the C-profile, and to engage the web by the pin in the hole.

2. The device according to claim 1, wherein the first part comprises at one end at least a first element thereof, and the second part comprises at one end at least a second element thereof, and wherein said second element engages said first element from behind to form the pivot axis and to hold the first part and second part together.

3. The device according to claim 2, wherein the first and second elements comprise at least one projection and one recess, wherein the one projection engaging in either one of the one recess and engaging means fitted on the projection engaging, and wherein said one projection engages from behind, corresponding receiving means fitted in the one recess.

4. The device according to claim 2, wherein the first part comprises, at another end thereof a rear engagement portion for engaging the structure from behind, wherein the rear engagement portion of the first part engages the flange portion of the C-profile from behind via a hook.

5. Device according to claim 1, wherein the pin comprises a first cylinder which has a substantially semi-circular cross-section and matches a second cylinder having a corresponding semi-circular cross-section.

6. Device according to claim 1, wherein the basic holder comprises a third part, one end of which is attached to the rear engagement portion of the first part so as to be pivotal about a pivot axis and the other end of which is fastenable to the structure.

7. Device according to claim 6, wherein the third part is formed as an angle bracket.

8. Aircraft or spacecraft, comprising: a structure, a system; and a device according to claim 1, which is fastened to the structure and holds the system relative to the structure.

9. Aircraft or spacecraft according to claim 8, wherein the structure is formed as a C-profile, the first part of the device resting in a planar manner against a flange of the C-profile and the second part of the device resting in a planar manner against a web of the C-profile.

10. Aircraft or spacecraft according to claim 9, wherein the pin engages in a hole in the web of the C-profile.

11. Aircraft or spacecraft according to claim 9, wherein the rear engagement portion of the first part engages the flange of the C-profile from behind.

12. Aircraft or spacecraft according to claim 10 wherein the third part, which is formed as an angle bracket, is engaged at its other end with the pin.

* * * * *